United States Patent [19]

Ayame

[11] Patent Number: 5,430,794
[45] Date of Patent: Jul. 4, 1995

[54] CALL CHARGE MANAGEMENT DEVICE IN PRIVATE BRANCH EXCHANGE SYSTEM

[75] Inventor: Shogo Ayame, Fuchu, Japan

[73] Assignee: Kabushiki Kaisha Toshiba, Kawasaki, Japan

[21] Appl. No.: 77,433

[22] Filed: Jun. 17, 1993

[30] Foreign Application Priority Data

Jun. 18, 1992 [JP] Japan .................. 4-159663

[51] Int. Cl.⁶ ............... H04M 15/00; H04M 3/42
[52] U.S. Cl. .................................. 379/114; 379/111; 379/112; 379/115; 379/207
[58] Field of Search ............... 379/111, 112, 114, 115, 379/207, 220, 225, 231, 234

[56] References Cited

U.S. PATENT DOCUMENTS

| | | | |
|---|---|---|---|
| 4,027,104 | 5/1977 | Levitt et al. | 379/234 |
| 4,136,264 | 1/1979 | Yoshizaki | 379/225 |
| 4,594,477 | 6/1986 | Noirot | 379/225 |
| 4,661,974 | 4/1987 | Bales et al. | 379/225 |
| 4,769,834 | 9/1988 | Billinger et al. | 379/112 |
| 4,788,719 | 11/1988 | Gupta | 379/114 |
| 5,027,387 | 6/1991 | Moll | 379/112 |
| 5,163,042 | 11/1992 | Ochiai | 379/112 |
| 5,185,785 | 2/1993 | Funk et al. | 379/111 |
| 5,247,571 | 9/1993 | Kay et al. | 379/207 |

*Primary Examiner*—Stephen Chin
*Assistant Examiner*—Vijay Shankar
*Attorney, Agent, or Firm*—Finnegan, Henderson, Farabow, Garrett & Dunner

[57] ABSTRACT

A call charge management device in a private branch exchange system including a first private branch exchange installed in a first charge area and a second private branch exchange installed in a second charge area different from the first charge area, the first and second exchanges being connected through a private line. After a telephone call based on a call from a terminal accommodated in the first charge area has ended, the call charge management device receives information on a calling terminal number, call start time, communication time, outgoing path number and called terminal number, searches for a station area code corresponding to the outgoing path number of the information from a table where station area codes are stored in correspondence with outgoing path numbers, calculates a call charge on the basis of the searched station area code and the received information, and charges the calling terminal the calculated call charge.

10 Claims, 7 Drawing Sheets

| STX | CALLING TERMINAL NO. | CALL START TIME | COMMUNICATION TIME | OUTGOING PATH NO | CALLED TERMINAL LOCATION NO. | ETX |

| OUTGOING PATH NO. | STATION AREA CODE |
|---|---|
| 1 | 0425 |
| 2 | 03 |
| 3 | 03 |
| ⋮ | ⋮ |

FIG.4

| AREA CODE | X-COORDINATE | Y-COORDINATE |
|---|---|---|
| 011 | 622 | 861 |
| 01232 | 634 | 848 |
| 01233 | 634 | 848 |
| ⋮ | ⋮ | ⋮ |

FIG.5

| WEEKDAY | 00:00~06:00 | MIDNIGHT |
|---|---|---|
| | 06:00~08:00 | NIGHTTIME |
| | 08:00~19:00 | DAYTIME |
| | 19:00~23:00 | NIGHTTIME |
| | 23:00~24:00 | MIDNIGHT |
| HOLIDAY | 00:00~06:00 | MIDNIGHT |
| | 06:00~23:00 | NIGHTTIME |
| | 23:00~24:00 | MIDNIGHT |

FIG.6

| DISTANCE | SECONDS IN DAYTIME | SECONDS IN NIGHTTIME | SECONDS IN MIDNIGHT |
|---|---|---|---|
| IN AREA | 180 | 180 | 240 |
| ADJACENT AREA | 90 | 90 | 120 |
| 20 | 90 | 90 | 120 |
| 30 | 38 | 38 | 50 |
| ⋮ | ⋮ | ⋮ | ⋮ |

FIG.7

| EXTENSION NO. | NUMBER OF CALLS | COMMUNICATION TIME | CALLS CHARGE |
|---|---|---|---|
| 2000 | 12 | 0:42:16 | 560 |
| 2001 | 3 | 0:06:23 | 30 |
| 2002 | 54 | 3:10:05 | 5690 |
| ⋮ | ⋮ | ⋮ | ⋮ |

FIG.8

| STATION AREA CODE OF SYSTEM BASE |
|---|
| 0 3 |

FIG.9

| INITIAL CHARGE FOR PRIVATE LINE | UNIT CHAREGE OF PRIVATE LINE | COMMUNICATION TIME PER UNIT CHARGE OF PRIVATE LINE |
|---|---|---|
| 10 (YEN) | 10 (YEN) | 180 (SECONDS) |

FIG.10

CALL CHARGE MANAGEMENT DEVICE IN PRIVATE BRANCH EXCHANGE SYSTEM

BACKGROUND OF THE INVENTION

1. Field of the Invention

The present invention relates to a call charge management device connected to one private branch exchange in a private branch exchange system for managing telephone call charges for extension telephone sets connected to a plurality of private branch exchanges, and more particularly to a call charge management device capable of performing appropriate call charge management in a private branch exchange system including a plurality of private branch exchanges connected thereto through private lines.

2. Description of the Related Art

Conventionally, a call charge management device connected to a private branch exchange for managing call charges for a plurality of extension telephone sets connected to the private branch exchange has been so arranged that, when a call is originated from any one of the extension telephone sets, the call charge management device calculates a call charge on the basis of a communication time and a distance between a calling telephone set and a called party determined from a place where the private branch exchange is installed, and charges the calling extension telephone set the calculated charge for that telephone call.

Recently, there has been proposed a private branch exchange system which comprises a private branch exchange as a system base and a station connected to the private branch exchange through a private line and installed in a charge area different from a charge area where the private branch exchange is installed. That is, the system extends over the different charge areas. In the private branch exchange system of this type, the private branch exchange as the system base accommodates a plurality of extension telephone sets and a plurality of office lines which are connected to a public network. The private branch exchange is connected through the private line to the station which is connected to the public network and which is installed in a charge area different from a charge area where the private branch exchange is installed. The private branch exchange is also connected to a call charge management unit for performing telephone call charge management for the plurality of extension telephone sets.

When a call is originated from an extension telephone set connected to the private branch exchange as the system base to another telephone set connected to the public network, there are two possible routes to choose from, one being a route connecting directly to the public network through the exchange and the other one being a route connecting to the public network through the station connected to the exchange through a private line.

Conventionally, the call charge management device in the private branch exchange system of this type has been configured to calculate the call charge on the basis of a communication time and a distance to a called party determined from a place where the private branch exchange is installed and to charge the calling extension telephone set the calculated call charge even when any one of the above two routes is selected.

According to such configuration, an accurate call charge cannot be charged for each of the extension telephone sets.

Assume, for example, that an extension telephone set connected to the private branch exchange as the system base places a call through a station, which is connected through a private line to the exchange and installed in a charge area different from the charge area where the exchange is installed, to communicate with a destination telephone set connected to a public network. In this case, the conventional call charge management device calculates the call charge on the basis of the communication time and the distance between the called telephone set and the exchange as the system base and charges the calling telephone set the calculated call charge.

However, the private line is used between the station and the exchange as the system base. Thus, if the distance calculated from the place where the exchange as the base system locates is used to calculate the call charge, the calculated call charge will be different from an actual amount and hence appropriate call charge management cannot be ensured.

SUMMARY OF THE INVENTION

It is therefore an object of the present invention to provide a call charge management device in a private branch exchange system which is capable of providing accurate call charge management even in the private branch exchange system installed over different call charge areas.

In order to achieve the above object, according to one aspect of the present invention, there is provided a telephone call charge management device in a private branch exchange system, comprising: a first private branch exchange as a system base installed in a first charge area and to which a call charge management unit is connected; a second private branch exchange connected through a private line to the first private branch exchange and installed in a second charge area different from the first charge area, in which the first private branch exchange sends the call charge management unit charge information indicative of that the second private branch exchange is a basis for calculation of a call charge when an extension terminal accommodated in the first private branch exchange places a call to a public line through the private line and the second private branch exchange, and in which the call charge management unit calculates, on the basis of the charge information, the charge for a telephone call of the calling terminal through the public line from the place where the second private branch exchange locates.

According to another aspect of the present invention, there is provided a call charge management device in a private branch exchange system, comprising: a first private branch exchange as a system base installed in a first charge area and to which a call charge management unit is connected; a second private branch exchange connected through a private line to the first private branch exchange and installed in a second charge area different from the first charge area, in which the first private branch exchange sends the call charge management unit charge information indicative of that the second private branch exchange is a basis for calculation of a call charge when an extension terminal accommodated in the first private branch exchange places a call to a public line through the private line and the second private branch exchange, and in which the call charge management unit calculates, on the basis of the charge information, the charge for a telephone call of the calling terminal through the public line from the place where the second private branch exchange locates and adds a charge for use of the private line to the calculated call charge for the public line so as to calculate a call charge inclusive of the charge for use of the private line.

According to the call charge management device of the present invention, even when a calling terminal places a call through a line accommodated in a charge area different from the charge area where the calling terminal is located, the call charge can be calculated accurately.

BRIEF DESCRIPTION OF THE DRAWINGS

FIG. 4 is a table showing a relationship between station area codes and outgoing path numbers;

FIG. 5 is a table showing a relationship between area codes and X- and Y geographical coordinates;

FIG. 6 is a table showing a discount time zone;

FIG. 7 is a table showing correspondence of communication time per unit charge to call distances;

FIG. 8 is a table used for providing call charge management in correspondence with respective extension numbers;

FIG. 9 is a table showing a station area code of a system base;

FIG. 10 is a charge table used for calculating a charge for use of a private line.

DESCRIPTION OF THE PREFERRED EMBODIMENTS

One embodiment of the present invention will be described with respect to the accompanying drawings.

Figures 1, 2:
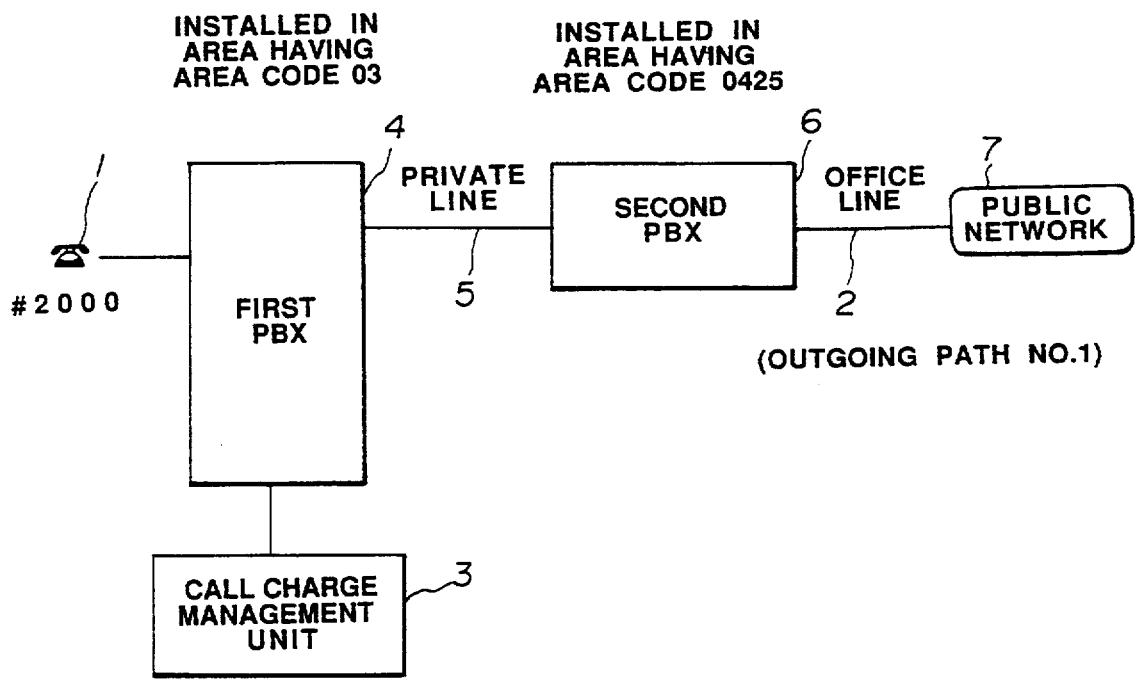
FIG. 1 shows one embodiment of a private branch exchange system provided with a call charge management device according to the present invention.
FIG. 2 shows a record sent from a first private branch exchange to a call charge management unit in FIG. 1.

FIG. 1 shows one embodiment of a private branch exchange system provided with a call charge management device according to the present invention. In the embodiment, a private branch exchange system installed over different charge areas comprises a first private branch exchange 4 installed in a charge area having a station area code "03" and a second private branch exchange 6 connected through a private line 5 to the first exchange 4 and installed in a charge area having a station area code "0425" which is different from the charge area having the area code "03". In the embodiment, the first private branch exchange 4 is set to be a system base of the private branch exchange system and the second private branch exchange 6 constitutes part of the first private branch exchange 4. The first private branch exchange 4 has a calling terminal 1 with an extension number "2000" and a call charge management unit 3 connected thereto while the second private branch exchange 6 is connected through an office line 2 of an outgoing path number "1" to a public network 7.

Assume, in the embodiment, that the calling terminal 1 with the extension number "2000" places a call through the first private exchange 4, private line 5, second exchange 6, and office line 2 of the outgoing path number "1" to the public network 7 to communicate with a called terminal (not shown) accommodated in the network 7. When the calling terminal 1 places the call to the office line 2 and has ended the communication with the called terminal, the telephone charge management unit 3 receives as a record the calling terminal number, call start time, communication time, outgoing path number and called terminal number as shown in FIG. 2 from the first exchange 4, and calculates the call charge on the basis of the record and manages the call charge for the respective calling terminal numbers.

Figure 3:
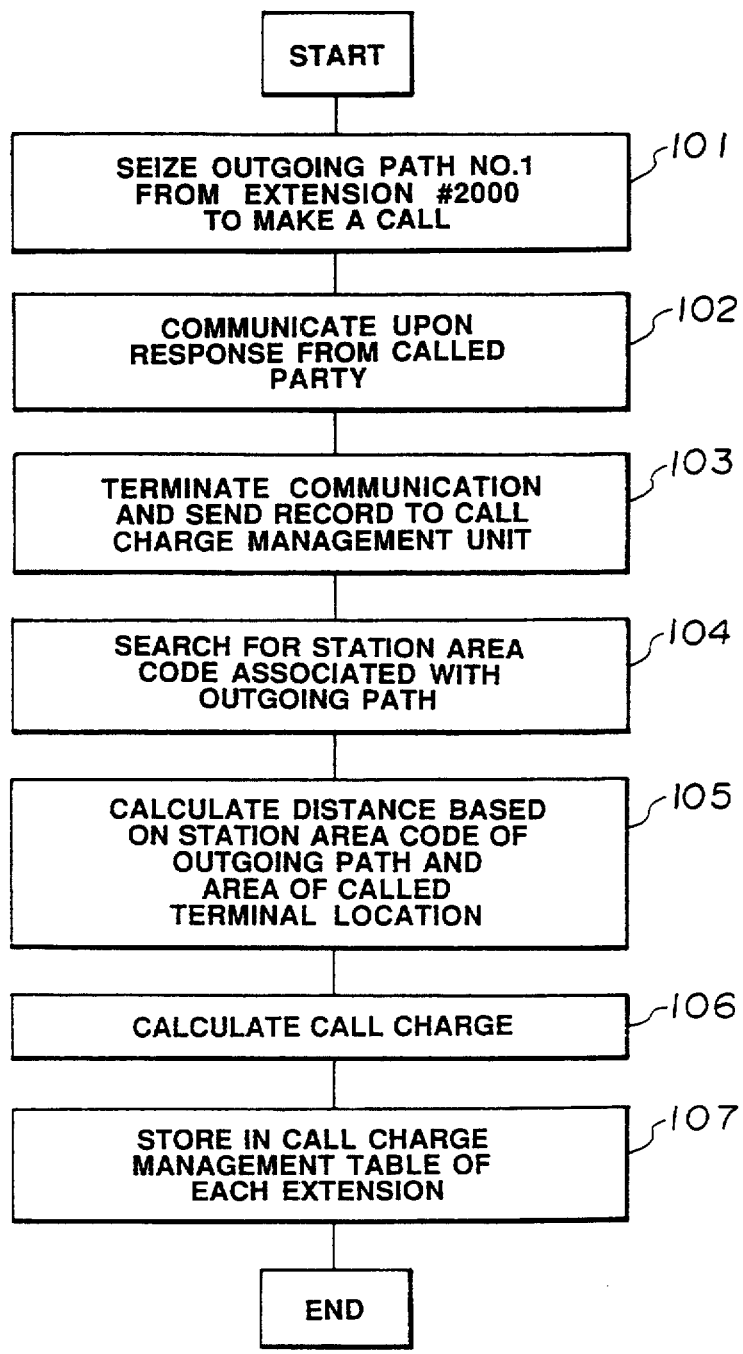
FIG. 3 is a flowchart indicative of the operation of the first embodiment of the present invention.

The operation of the call charge management unit 3 will be described in more detail with respect to a flowchart of FIG. 3.

When the calling terminal 1 with the extension number "2000" catches the office line 2 of the outgoing path number "1" and generates a calling signal (step 101), this calling signal is transmitted through the first exchange 4, private line 5, second exchange 6, and office line 2 of the outgoing path number "1" to a called terminal (not shown). When the called terminal responds to the calling signal, communication takes place (step 102).

When the communication has ended, the exchange 4 sends a record of the type shown in FIG. 2 to the call charge management unit 3 (step 103).

The management unit 3 will know the outgoing path number from the received record of FIG. 2 and searches for a station area code corresponding to the outgoing path number in the table of FIG. 4 (step 104). Thus, the management unit 3 knows that the station area code corresponding to the outgoing path number "1" is "0425".

The management unit 3 then refers to a table of FIG. 5 on the basis of the called terminal location number in FIG. 2 and the previously searched station area code "0425", and calculates the distance between the calling extension terminal 1 and the charge area in which the called terminal locates on-the basis of the X- and Y geographical coordinates in FIG. 5 (step 105).

The management unit 3, on the basis of the distance calculated at step 105 and the call start time and communication time obtained from the record of FIG. 2, refers to the table in FIG. 6 which represents a discount time zone and a table in FIG. 7 which represents the call distance and communication time per unit time so as to calculate the call charge (step 106).

The management unit 3 counts up the number of calls, adds the communication time indicated by the received record to the communication time accumulated so far, adds the call charge calculated at step 106 to the call charge accumulated so far, and stares these data in a column for the extension number "2000" on the call charge management table of FIG. 8 (step 107).

The management unit 3 charges the calling terminal 1 with the extension number "2000" the calculated call charge.

In this embodiment, when the calling terminal 1 with the extension number "2000" catches an office line accommodated in the same charge area as that of the calling terminal 1, i.e., an office line of an outgoing path number corresponding to the station area code "03" to place a call without the use of the private line 5, the management unit 3 calculates the call charge from a station in the same charge area as the calling terminal 1, i.e., from the place where the exchange 4 as the system base locates.

As described above, in the present embodiment, even when the calling terminal catches an office line accommodated in a charge area different from the charge area where the calling terminal is accommodated to place a call, the call charge management device searches for a station area code from an outgoing path number of that office line and calculates the call charge, so that the call charge is calculated accurately.

In the present embodiment, when the calling terminal 1 with the extension number "2000" catches the office line 2 of the outgoing path number "1" to place a call, it uses the private line 5 connecting the first and second exchanges 4 and 6. However, the charge for use of the private line 5 is not calculated.

Another embodiment involving calculation of a call charge inclusive of the charge for use of the private line 5 will be described below.

In this embodiment, the call charge management unit 3 includes the tables of FIGS. 4-8, a table indicative of the station area code of the system base of FIG. 9 and a charge table for a private line of FIG. 10.

Figure 11:
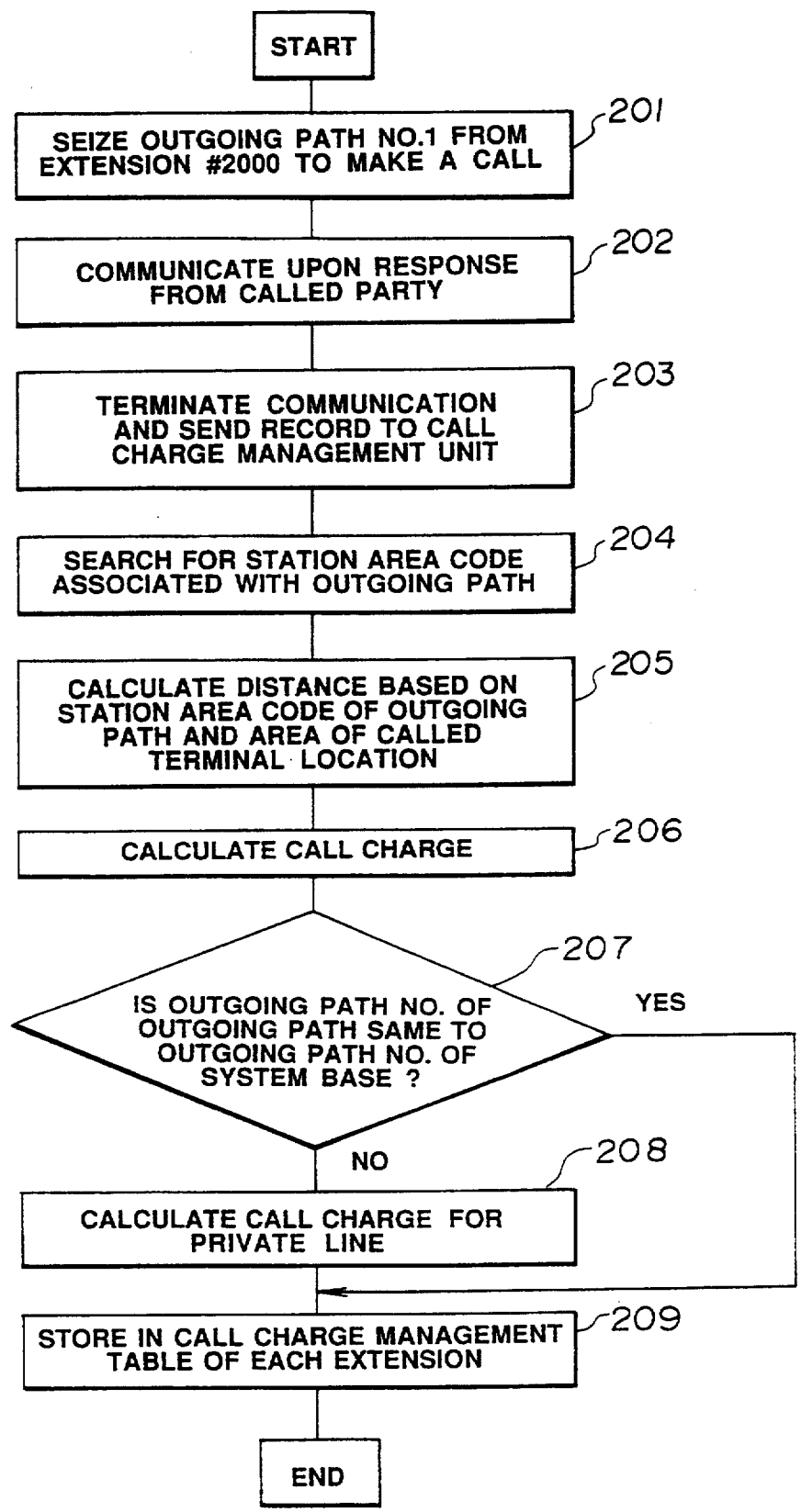
FIG. 11 is a flowchart indicative of the operation of a second embodiment of the present invention.

The call charge management unit 3 of the present embodiment will be described in detail with respect to the flowchart of FIG. 11.

When the calling terminal 1 with the extension number "2000" catches the office line 2 of the outgoing path number "1" to place a call (step 201) and a called terminal responds, communication with the called terminal takes place (step 202). When the communication has ended, the first exchange 4 sends a record of the type shown in FIG. 2 to the management unit 3 (step 203). The management unit 3 knows the outgoing path number from the received record and searches for a station area code corresponding to the outgoing path number in the table of FIG. 4 (step 204). Thus, it knows that the station area code corresponding to the outgoing path number "1" is "0425".

The management unit 3 then refers to the table of FIG. 5 on the basis of the called terminal number of the record of FIG. 2 and the previously searched station area code "0425", and calculates the distance between the calling extension terminal and the place where the called terminal locates on the basis of the X- and Y geographical coordinates in FIG. 5 (step 205).

The management unit 3, on the basis of the distance calculated at step 205 and the call start time and communication time obtained from the record of FIG. 2, refers to the table of FIG. 6 which represents a discount time zone and a table of FIG. 7 which represents the call distance and communication time per unit time to calculate the call charge (step 206).

The management unit 3 compares the station area code (in this case, "0425") of the office line 2 of the outgoing path number 1 to the station area code (in this case, "03") of the system base shown in FIG. 9 (step 207). When these numbers are different, the management unit 3 refers to the private line charge table of FIG. 10 and calculates the call charge for use of the private line (step 208). Then, the management unit 3 counts up the number of calls, adds the communication time indicated by the received record of FIG. 2 to the communication time accumulated so far, adds the call charge calculated at step 206 and the call charge for the use of the private line calculated at step 208 to the call charge accumulated so far, and stores these data in a column for the extension number "2000" in the call charge management table of FIG. 8 (step 209).

The management unit 3 charges the calling terminal 1 with the extension number "2000" the calculated call charge.

As described above, in the present embodiment, since the call charge for the use of the private line is also calculated and added, accurate call charge calculation can be realized.

In this embodiment, when the calling terminal 1 with the extension number "2000" catches an office line in the same charge area as the calling terminal 1 to place a call to a terminal without the use of the private line 5, the management unit 3 calculates the call charge from the same charge area as the calling terminal 1, i.e., from the place where the first exchange 4 as the system base locates. In this case, the charge for use of the private line 5 is not added.

As described above, in this embodiment, even when a calling terminal catches an office line accommodated in a charge area different from a charge area where the calling terminal is accommodated to place a call, the call charge management device searches for a station area code from an outgoing path number of that office line to calculate a call charge inclusive of a charge for the use of the private line, an accurate call charge calculation can be realized.

What is claimed is:

1. A call charge management device in a private branch exchange system, comprising:

first private branch exchange means as a system base installed in a first charge area;

second private branch exchange means connected through a private line to said first private branch exchange means and installed in a second charge area different from the first charge area;

call charge management means connected to said first private branch exchange means;

charge information sending means for sending said call charge management means charge information including outgoing path information indicative of an output path from said second private branch exchange means, when an extension terminal accommodated in said first private branch exchange means places a call to a public line through said private line and said second private branch exchange means and call charge calculating means provided in said call charge management means for calculating, from a place where said second private branch exchange means is installed, a charge for a telephone call placed by the extension terminal with use of the public line on the basis of the outgoing path information included in the charge information.

2. A call charge management device according to claim 1, wherein said charge information comprises:

communication time information indicative of a communication time; and communication destination information indicative of a communication destination, and wherein said call charge calculating means calculates a distance to said communication destination from the place where said second private branch exchange means is installed on the basis of the communication destination information and calculates a call charge for use of the public line on the basis of the calculated distance and the communication time indicated by the communication time information.

3. A call charge management device according to claim 2, wherein the charge information comprises:
- calling terminal identification information for identifying a calling terminal; and
- wherein said call charge calculating means calculates the call charge for the use of the public line for each communication terminal in correspondence with the calling terminal identification information.

4. A call management device according to claim 2, wherein the charge information comprises:
- call start time information indicative of a call start time; and
- wherein said call charge calculating means calculates the call charge for use of the public line in correspondence with a time zone including the call start time on the basis of the call start time information.

5. A call charge management device according to claim 1, wherein the charge information comprises:
- calling terminal identification information for identifying a calling terminal;
- call start time information indicative of a call start time;
- communication time information indicative of a communication time;
- outgoing path information indicative of an outgoing path of the system; and
- communication destination information indicative of a communication destination,
- wherein said call charge calculating means comprises:
- a first table for storing therein information on a call charge for the calling terminal;
- a second table for storing therein information on a unit time as a basis for calculation of a call charge for use of the public line in correspondence with the call start time; and
- a third table for storing therein information on coordinates for calculating the distance to a communication destination in correspondence with the outgoing path and the communication destination,
- wherein said call charge calculating means calculates the distance to the communication destination from the outgoing path on the basis of the coordinate information stored in said third table, calculates a call charge for use of the public line for each communication terminal on the basis of the calculated distance, the unit time stored in said second table, the communication time indicated by the communication time information and the calling terminal identification information, and updates the call charge for the calling terminal stored in said first table with the calculated call charge.

6. A call charge management device in a private branch exchange system, comprising:
- first private branch exchange means as a system base installed in a first charge area;
- second private branch exchange means connected through a private line to said first private branch exchange means and installed in a second charge area different from the first charge area;
- call charge management means connected to said first private branch exchange means;
- charge information sending means for sending said call charge management means charge information including outgoing path information indicative of an outgoing path from said second private branch exchange means, when an extension terminal accommodated in said first private branch exchange means places a call to a public line through said private line and said second private branch exchange means; and
- call charge calculating means provided in said call charge management means for calculating, from a place where said second private branch exchange means is installed, a call charge for a call placed by the extension terminal with use of the public line on the basis of the outgoing path information included in the charge information, and an additional charge for use of the private line which is added to the calculated call charge for use of the public line to generate a total call charge inclusive of the charge for use of the private line.

7. A call charge management device according to claim 6, wherein said charge information comprises:
- communication time information indicative of a communication time; and
- communication destination information indicative of a communication destination;
- wherein said call charge calculating means calculates a distance to said communication destination from the place where said second private branch exchange means is installed on the basis of the communication destination information, calculates a call charge for use of the public line on the basis of the calculated distance and the communication time indicated by the communication time information, and adds the charge for use of the private line to the calculated call charge to calculate a call charge inclusive of the charge for use of the private line.

8. A call charge management device according to claim 7, wherein the charge information comprises:
- calling terminal identification information for identifying a calling terminal; and
- wherein said call charge calculating means calculates the call charge inclusive of the charge for use of the private line for each calling terminal in correspondence with the calling terminal identification information.

9. A call charge management device according to claim 7, wherein the charge information comprises:
- call start time information indicative of a call start time; and
- wherein said call charge calculating means calculates the call charge inclusive of the charge for use of the private line in correspondence with a time zone indicated by the call start time information.

10. A call charge management device according to claim 6, wherein the charge information comprises:
- calling terminal identification information for identifying a calling terminal;
- call start time information indicative of a call start time;
- communication time information indicative of a communication time;
- outgoing path information indicative of an outgoing path of the system; and
- communication destination information indicative of a communication destination,
- wherein said call charge calculating means comprises:
- a first table for storing therein information on a call charge for said calling terminal;
- a second table for storing therein information on a first unit time as a basis for calculation of a call charge for use of the public line in correspondence with the call start time;

a third table for storing therein information on coordinates for calculating the distance to a communication destination in correspondence with the outgoing path and the communication destination; and a fourth table for storing therein information on a second unit time as a basis for calculation of the call charge for use of the private line;

wherein said call charge calculating means calculates the distance to the communication destination from the outgoing path on the basis of the coordinate information stored in said third table, calculates a call charge for use of the public line for each communication terminal on the basis of the calculated distance, the first unit time stored in said second table, the communication time indicated by the communication time information and the calling terminal identification information; adds to the calculated call charge for the public line the charge for use of the private line calculated on the basis of information on the second unit time stored in said fourth table and the communication time indicated by the communication time information to calculate a call charge inclusive of the charge for use of the private line, and updates the call charge associated with the calling terminal in said first table with the call charge inclusive of the calculated charge for use of the private line.

* * * * *